United States Patent
Joux et al.

[15] 3,693,256
[45] Sept. 26, 1972

[54] PROCESS AND APPARATUS FOR CONTINUOUSLY SEPARATING AND WASHING A COAGULUM AND MORE PARTICULARLY CURD FOR MAKING CHEESE AND CASEIN

[72] Inventors: Jean-Louis Fernand Joux, Epinay; Bernard Michel Mignot, Les Rottes, Vendome, both of France; Michel Gaston Albert Billon, Kavaklidere - Ankara, Turkey

[73] Assignee: Fromageries Bel-La Vache Qui Rit, Paris (Seine), France

[22] Filed: July 22, 1970

[21] Appl. No.: 57,212

[52] U.S. Cl. ...................................................31/46
[51] Int. Cl. ..........................A01j 25/00, A01j 25/11
[58] Field of Search.....................................31/46, 89

[56] References Cited

UNITED STATES PATENTS 3,606,683   9/1971   Joux et al. .......................31/46
3,585,722   6/1971   Legueux...........................31/46
2,781,269   2/1957   Harper et al..................99/116
3,044,863   7/1962   Osborne et al. ..............31/89

Primary Examiner—Hugh R. Chamblee
Attorney—Waters, Roditi, Schwartz & Nissen

[57] ABSTRACT

Apparatus for continuously processing a coagulated raw milk product comprising a constant-level mixture separating chamber and at least one means for compressing the curd in the whey. The means for discharging the whey from the curd compressing means communicate with a point on the apparatus located upstream of the curd compressing means, the whey discharge means have connected thereinto a pressure-gauge and an adjustable-output pump, a smooth tube is positioned upstream of each curd compressing means, and the curd compressing means is a perforated tube the perforations of which are slots parallel to its axis. This apparatus can be applied with advantage to the production of cheesemaking curds.

10 Claims, 3 Drawing Figures

PATENTED SEP 26 1972
3,693,256
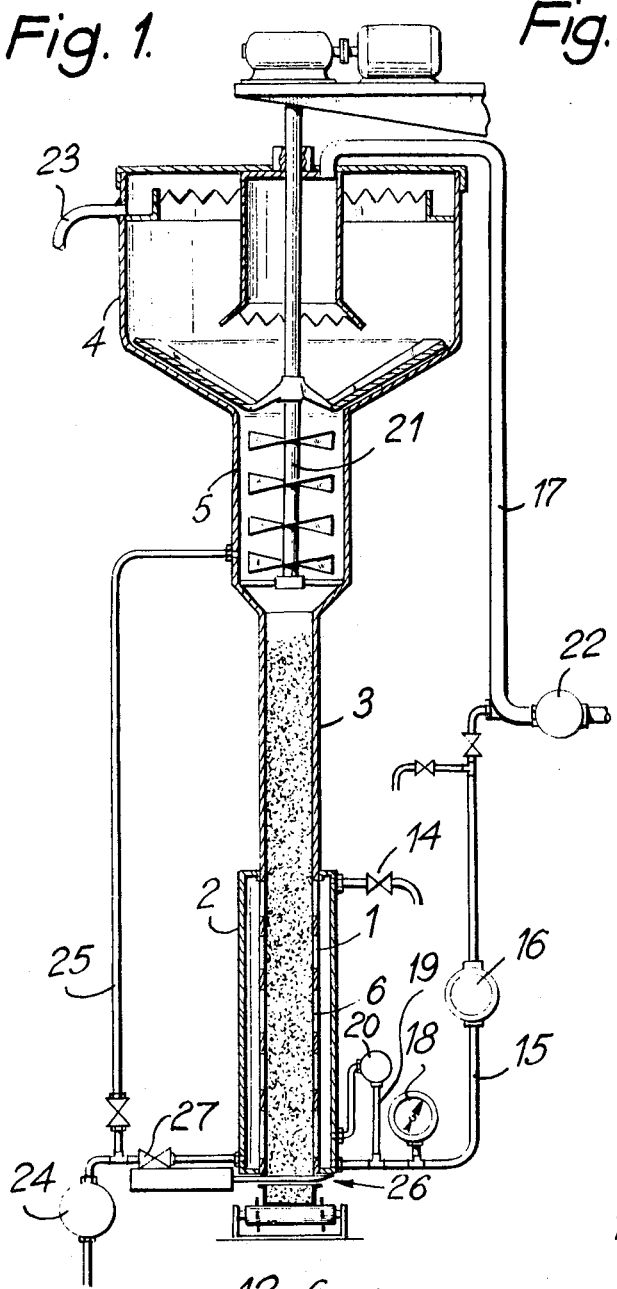
Fig. 1.
Fig. 3.
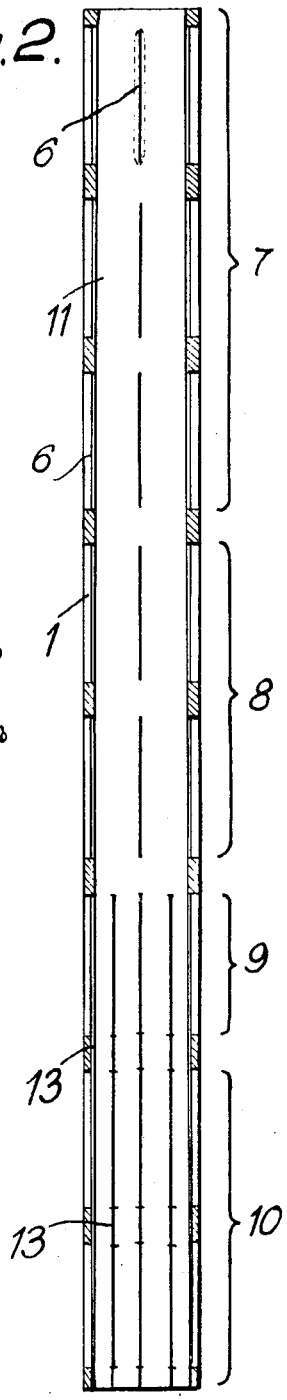
Fig. 2.

PROCESS AND APPARATUS FOR CONTINUOUSLY SEPARATING AND WASHING A COAGULUM AND MORE PARTICULARLY CURD FOR MAKING CHEESE AND CASEIN

BACKGROUND OF THE INVENTION

Already known by U.S. application Ser. No. 712,541 of Mar. 12th, 1968, now U.S. Pat. No. 3,606,683, filed by Joux and Blanchet are an apparatus and a method for continuously processing a raw milk product in the form of mixtures of two phases of different density, one being whey which usually constitutes the light phase and the other being curd grains which usually constitute the heavy phase. This process consists in separating the curds from the major part of the whey by decanting and, where necessary, in washing them and causing them to travel in counter-current against a wash solution, and in thereafter pressing these curds so as to cause them to weld together at the same time as eliminating an additional quantity of the aqueous phase.

The apparatus described in said application includes, in series, pumping means for pumping the mixture, a vertical cylindrical decanting drum including an upper and lower portion, a whey discharge conduit communicating with said upper portion of said decanting drum, conduit means communicating said pumping means with said upper portion of said decanting drum, a vertical cylindrical pressing column including a lower portion and an upper portion supporting coaxially said lower portion of said decanting drum, further pumping means for pumping the grains, further conduit means communicating said further pumping means with said lower portion of said pressing column and a further whey discharge conduit communicating with said upper portion of said pressing column. In a preferred embodiment, the pressing column includes a perforated tube down which the curd descends and through which the whey is discharged.

The process described in said application comprises successively continuously conveying said mixture in a direction from top to bottom in a decanting zone, decanting said mixture in said decanting zone so that a portion of the whey travels to the top of the decanting zone and the curd grains partially separated from the whey travel to the bottom of the zone, directing the curd grains partially separated from the whey continuously along a path from top to bottom in a pressing zone, directing the remainder of the whey laterally through a perforated wall and the curd grains toward the bottom of the pressing zone, and continuously extracting the curd grains at the bottom of the pressing zone.

It is to be noted that compression of the curd is an operation well known in the conventional cheesemaking art and is designed to obtain, from curd grains prepared in a vat in mixture form with the whey, a coherent mass of curd in which the grains are welded together. In order to prevent air from penetrating into this mass, which would result in a cheese paste flawed by "blue-moulding", it is preferable to compress the curd in the whey, either under its own weight or under very slight pressure, at least until the greater part of the whey has been expelled therefrom. This is what is known as "compression of the curd under the whey".

This operation can be performed in special flat-bottomed vats. After the whey has been emptied from the vat, a curd "cake" is obtained which is cut up either into product-units which are placed in moulds for draining or pressing, or into larger blocks which are first "shaped" in perforated tubes inside which they undergo additional draining before being cut up into product-units which are then placed in a mould.

Alternatively, the curd from the cheesemaking vat can be "poured" directly into perforated "shaping" tubes, and, as soon as most of the whey has drained away and the grains have welded together, the block of the curd can be cut up into product-units which are then placed in a mould. Lastly, the curd from the cheesemaking vat can in some cases be "poured" directly into moulds. The factors which will govern the choice from among these different methods, which are based on the same principle, are firstly the nature of the product to be obtained and secondly the need to obtain as accurate as possible regulating of the weight of the cheese.

These several operations of compressing, shaping and moulding the cheesemaking curd have been the subject of extensive research designed to make them more rational, and various machines have been devised and proposed for performing these operations.

Further, the development of new processes for producing curd continuously makes it even more necessary to device likewise continuous solutions for the stages of compression under the whey and of shaping the curd. However, a number of difficulties have to be overcome in order to achieve this.

As is well known per se, the simplest procedure for accomplishing these operations continuously is for a perforated tube to be fed continuously at one end with a mixture of curd and whey issuing either from a cheesemaking vat or from means for producing such a mixture continuously.

The whey drains out through the perforations in the tube and the curd grains gradually weld together as the mixture travels through the tube. A curd "bung" is obtained at the other end of the tube, which, through the agency of suitable mechanical means, is cut up into constant-length sections which are received in the moulds.

A first difficulty arises from the gradual clogging of the tube perforations. The greater the quantity of whey to be discharged in relation to the quantity of curd, the damper the curd, the more it contains of fine particles, and the greater the difference in pressure between the interior and the exterior of the tube, the more rapidly will such clogging take place for a given tube feed rate. As a result, the curd obtained becomes less and less compressed and welded as time goes by, until normal operation of the apparatus is ultimately interrupted. Moreover, the weight of the cheeses obtained is not constant because the latter contain different proportions of residual whey. If on the other hand the pressure at which the tube is fed with curd is reduced in order to limit such clogging, it becomes difficulty to achieve adequate compression, but even if this were possible the curd could form a plug inside the tube, mainly because of its elasticity, thereby completely blocked the flow.

In an intermittently operating tube for compression under the whey, it is generally possible to maintain losses from fine curd particles entrained by the whey at an acceptable level. By contrast, when operation is continuous, the pressure which it is necessary to maintain in order to keep the mixture flowing may substantially increase such losses, thereby reducing the economic utility of the process.

Another drawback, which affects the uniformity of the compression and hence the uniformity of the cheese weights, stems from the fact that, in a continuously operating compression-in-the-whey tube, it is difficult to ensure a constant mixture feed pressure and a constant pressure differential across the interior and exterior of the tube, and to maintain a constant curd mass therein, especially when a plurality of parallel-connected tubes have to be fed simultaneously.

Finally, with such a compression tube, it is usually difficult to achieve steady-state operating conditions of the apparatus a short time after start-up, which, as has been observed in practice, results in non-uniform compression of the cheeses and the risk of clogging the tube.

SUMMARY OF THE INVENTION

The present invention accordingly has for its object to overcome these various difficulties in particular, and, more generally, to enable apparatus for continuously compressing and shaping curds in the whey to function for an extended length of time whereby to permit the obtainment of a suitably welded end-product of uniform composition and guarantee a satisfactory regulating of the weights at the cutting up and end-product stages alike.

To that end the present invention provides for the following improvements to such apparatus :

firstly, the means for discharging the whey from the perforated tube may be caused to communicate with a point in the apparatus located upstream of said tube;

secondly, such discharge means may have, connected thereinto, a pressure-gauge and a pump of adjustable delivery rate for discharging the whey at constant pressure;

thirdly, a smooth standby tube may be positioned upstream of the perforated tube, and the curd discharge means may have its output rate adjusted so as to maintain the curd level constant in the upper portion of said standby tube;

lastly, a set of perforations may be provided such that the whey outflow area increases downwardly along the tube.

BRIEF DESCRIPTION OF THE DRAWINGS

The description which follows with reference to the accompanying non-limitative exemplary drawings will give a clear understanding of how the invention can be carried into practice.

In the drawings:

FIG. 1 is a side elevation view in diametrical section of apparatus according to the invention;

FIG. 2 shows the perforated tube thereof, on an enlarged scale ; and

FIG. 3 is a cross-sectional view of said tube at the level of a slot.

DETAILED DESCRIPTION OF THE INVENTION

The apparatus shown in FIG. 1 comprises three main sections placed one above the other, to wit: a lower section formed by a perforated tube 1 surrounded by a jacketing tube 2 in which the compression whey is collected, an intermediate section formed by a single standby tube 3 for holding the curd prior to compression, of identical cross-section to the perforated tube and preferably made of glass, and an upper section formed by a constant-level chamber into which the mixture of curd grains and whey is delivered continuously.

As shown in the figure, said chamber is preferably formed by stacking, one above the other, a decanter 4 and a washing tubular chamber 5 as described in the above identified application, though without in any way limiting the scope of the application of the apparatus. It is to be noted however that a combination utilizing such a chamber makes it possible to resolve numerous problems in a particularly simple way, namely that of feeding the apparatus at constant pressure by accomplishing an effective compression in the whey (the curd being at no time in contact with the air) that of greatly reducing the quantity of whey introduced with the curd into the compression tube (thereby limiting the risk of clogging), that of enabling, by recycling the whey extracted from the compression tube back into the decanter, recovery from the curd mass of the fine particles entrained in the whey, and lastly that of facilitating a uniform distribution of curd in a possible plurality of tubes parallel-connected to the same decanter.

The holding or standby tube 3, within which the mixture of curd and whey dwells for a time of the order of one to four minutes before penetrating into the perforated tube, performs two functions : firstly, that of maintaining the curd level above the upper perforations of tube 1 so as to facilitate compression by limiting the whey extraction rate, and secondly that of ensuring welding of the grains to some extent, prior to the start of the compression phase, thereby making it possible in particular to reincorporate into the curd the major part of the fine particles, the main consequence of which is to limit clogging of the perforations.

As shown in FIG. 2, perforated tube 1 embodies narrow slot-like perforations 6 directed parallel to the tube axis and arranged in horizontal rows 7, 8, 9 and 10 of equidistant slots. The length of the slots is of the order of 50 to 150 mm and preferably 120 mm, and their width is of the order of 0.2 to 1 mm.

The number and width of the slots in the different rows are not constant throughout the length of the tube, but increase in the downward sense.

This arrangement enables steady-state operating conditions of the apparatus to be obtained more readily after start-up. The increase in cross section available for flow of the whey is in the ratio of approximately 1 to between 2 and 8 and is preferably in the ratio of 1 to 5 between the upper and lower rows. Further, the total cross-sectional area through the slots represents an order of magnitude of 20 to 100 square centimeters and is preferably equal to 50 square centimeters for a whey extraction rate of 100 liters per hour.

As shown in FIG. 3, in order to facilitate the release of the fine particles of curd, each slot is of the precedingly indicated width on the side of the internal tube wall 11, and this over a thickness of the order of 0.3 mm, after which it widens out toward the external tube wall 12 at an angle of the order of 30 to 90°, but preferably of 60°.

As a result of these dispositions, under operating conditions to be specified hereinafter, a certain stable condition of partial slot clogging is established that allows the apparatus to operate continuously.

In order to facilitate sliding of the curd through the tube under the effect of the constant pressure existing in the apparatus, the slots are as already indicated directed parallel to the tube axis, but they are further arranged in vertical columns, with the slots in any given column communicating with at least the lower rows of the tube through a vertical channel 13 formed in outer wall 11 to a depth of approximately 0.5 mm and a width identical to that of the slots. Finally, for the same reason, the cross-section of the tube increases slightly in the downward sense along its lower half, the increase being of the order of 3 to 9 percent but preferably 6 percent.

The apparatus further includes a whey extraction and recycling circuit which comprises means for regulating the offtake pressure. This circuit is formed by jacketing tube 2, the air from which has been expelled through a bleed valve 14, an extraction conduit 15 and an adjustable-output pump 16. This circuit enables the compression whey to be conveyed into decanter 4 either directly or via a conduit for admitting the whey-curd mixture into the decanter. Between jacketing tube 2 and pump 16 said circuit includes a pressure-gauge 18 for checking the compression in the manner to be explained hereinbelow.

Lastly, an ancillary circuit 19, which comprises a circulating pump 20 and through which whey is tapped at a certain rate and returned into the lower part of jacketing tube 2, enables the fine particles of curd to be maintained in suspension, thereby averting the obstructions which would otherwise occur if they were to deposit at the bottom of the jacketing tube.

The apparatus hereinbefore described functions in the following manner.

The apparatus is first filled with whey of adjusted temperature and composition, after which the constant-level chamber agitator shaft 21 is rendered operative and the air is expelled from jacketing tube 2. The mixture of curd grains and whey is admitted into the apparatus by means of a pump 22 through conduit 17. Most of the curd and the whey separate in decanter 4, the whey being collected by overflow and directed through a conduit 23. The curd grains drop under gravity to the bottom of the decanter, pass through washing tube 5 and holding tube 3 and begin to accumulate in perforated tube 1. If necessary, water or a wash solution is introduced through the bottom of the washing tube by means of a pump 24 and a conduit 25, the system comprising the decanter and the washing tube operating as described in the above identified patent application.

This system could, however, be replaced by a single constant-level chamber, as already indicated.

As soon as the curd level is sufficient, the process of drawing off whey through circuit 15 is begun. As the tube fills with curd, it will be noted that the pressure reading on the gauge 18, which previously indicated the hydrostatic pressure corresponding to the height of the column of liquid in the apparatus, begins to drop because of the increasing pressure loss undergone by the whey, firstly (and principally) through the curd cake which begins to concentrate and weld together, and secondly through the partially clogging tube slots. In other words, for a given whey extraction rate and a given degree of partial clogging of the slots, the pressure-gauge reading represents a measure of the degree of curd compression, which can accordingly be continuously monitored and adjusted during operation of the apparatus. In practice this pressure loss is adjusted to between 0.1 and 0.2 kg/cm$^2$ and for example to approximately 0.13 kg/cm$^2$, and is accurately held at this level during normal operating conditions by adjusting the rate of flow through extraction pump 16.

When the curd accumulation level reaches the upper end of holding tube 3, the process of drawing off curd from the lower end is begun, for example with automatic means 26 for slicing the curd and placing it in moulds at a rate which is adjusted so as to maintain this curd accumulation level constant.

Furthermore, the circuit 19 is rendered operative in order to maintain in suspension the fine curd particles passing from compression tube 1 into jacketing tube 2.

It goes without saying that many changes may be made to the specific form of embodiment hereinbefore described, without departing from the scope of the invention. For instance, a plurality of tube sets 1-2-3 could be connected to the same constant-level chamber 4-5, the number of such sets depending on the output rate it is required to obtain from the apparatus, in which case conduit means would interconnect the jacketing tubes in series, thereby making it possible to have only one whey extraction circuit 15 and only one circulating pump 20 common to the several tube sets. Further, the apparatus need not include a washing tube 5 in cases where the curd need not be washed, a case in point being curds for Cheddar type cheeses. Also, a conduit fitted with a valve 27 may be caused to communicate the washing-water circuit 25 with the jacketing tube 2 in order to allow possible unclogging of the perforation with water.

What we claim is:

1. Apparatus for the separation of a mixture of whey and cheese curd grains, the density of the grains being higher than that of the whey, said apparatus comprising in series, first pumping means for pumping the mixture, a vertical cylindrical decanting drum including an upper and lower portion, a first whey discharge conduit communicating with said upper portion of said decanting drum, first conduit means communicating said first pumping means with said upper portion of said decanting drum, a vertical cylindrical pressing column including a lower portion and an upper portion supporting coaxially said lower portion of said decanting drum, second pumping means for pumping the grains, second conduit means communicating said second pumping means with said lower portion of said pressing column, a second whey discharge conduit communicating with said upper portion of said pressing column and third conduit means communicating said second pumping means with an inlet provided on said apparatus upwardly of said pressing column.

2. Apparatus according to claim 1, wherein said inlet is provided in said upper portion of said decanting drum.

3. Apparatus for the separation of a mixture of whey and cheese curd grains, the density of the grains being higher than that of the whey, said apparatus comprising in series, first pumping means for pumping the mixture, a vertical cylindrical decanting drum including an upper and lower portion, a first whey discharge conduit communicating with said upper portion of said decanting drum, first conduit means communicating said first pumping means with said upper portion of said decanting drum, a vertical cylindrical column including a lower portion and an upper portion supporting coaxially said lower portion of said decanting drum, second pumping means for pumping the grains, second conduit means communicating said second pumping means with said lower portion of said pressing column, a second whey discharge conduit communicating with said upper portion of said pressing column, a pressure-gauge and an adjustable-output pump connected into said second whey discharge conduit.

4. Apparatus for the separation of a mixture of whey and cheese curd grains, the density of the grains being higher than that of the whey, said apparatus comprising in series, first pumping means for pumping the mixture, a vertical cylindrical decanting drum including an upper and lower portion, a first whey discharge conduit communicating with said upper portion of said decanting drum, first conduit means communicating said first pumping means with said upper portion of said decanting drum, a smooth tube supporting coaxially said lower portion of said decanting drum, a vertical cylindrical pressing column including a lower portion and an upper portion supporting coaxially said smooth tube, second pumping means for pumping the grains, second conduit means communicating said second pumping means with said lower portion of said pressing column and a second whey discharge conduit communicating with said upper portion of said pressing column.

5. Apparatus for the separation of a mixture of whey and cheese curd grains, the density of the grains being higher than that of the whey, said apparatus comprising in series, first pumping means for pumping the mixture, a vertical cylindrical decanting drum including an upper and lower portion, a first whey discharge conduit communicating with said upper portion of said decanting drum, first conduit means communicating said first pumping means with said upper portion of said decanting drum, a vertical cylindrical pressing column including a lower portion and an upper portion supporting coaxially said lower portion of said decanting drum, second pumping means for pumping the grains, second conduit means communicating said second pumping means with said lower portion of said pressing column, a second whey discharge conduit communicating with said upper portion of said pressing column and perforated vertical cylindrical tube supported internally of said pressing column, said perforated tube having a plurality of perforations formed by slots parallel to the axis of said tube.

6. Apparatus as claimed in claim 5, characterized by the fact that said perforated tube has a plurality of said slots, that it includes an upper portion and lower portion and that the width and said number of said slots go increasing from said upper portion to said lower portion.

7. Apparatus as claimed in claim 6, characterized by the fact that said slots are arranged in horizontal rows, said rows of slots having a combined area for passage therethrough which increases in the ratio of 1 to between 2 and 8 from said upper portion towards said lower portion of said perforated tube, the area for passage through said slots being from 0.2 to 1 square centimeter for a whey flow rate therethrough of one liter per hour.

8. Apparatus as claimed in claim 5, characterized by the fact that said perforated tube includes an upper portion and a lower portion, and that said slots are aligned parallel with the axis of said perforated tube and are interconnected, at least at said lower portion of said perforated tube, by channels formed internally thereto and aligned with said slots, the cross-section of said perforated tube increasing from said upper portion to said lower portion and at least over said lower portion.

9. Apparatus as claimed in claim 5, characterized by the fact that said perforated tube has an outer surface and that said slots flare outwardly in the direction thereof.

10. Apparatus according to claim 5, in which at the lower section of pressure column are disposed agitating means, in the vicinity of the junction of said second duct means on said pressure column.

* * * * *

UNITED STATES PATENT OFFICE
CERTIFICATE OF CORRECTION

Patent No. 3,693,256        Dated September 26, 1972

Inventor(s) Jean-Louis Fernand Joux, et. al.

It is certified that error appears in the above-identified patent and that said Letters Patent are hereby corrected as shown below:

On the cover sheet, insert -- [30] Foreign Application Priority Data  August 4, 1969  France........6926719 -- .

Signed and sealed this 2nd day of January 1973.

(SEAL)
Attest:

EDWARD M. FLETCHER, JR.                ROBERT GOTTSCHALK
Attesting Officer                       Commissioner of Patents